(12) United States Patent
Sakaguchi et al.

(10) Patent No.: US 11,130,349 B2
(45) Date of Patent: *Sep. 28, 2021

(54) INK, METHOD FOR PRODUCING INK, METHOD FOR PRINTING, AND PRINTER

(71) Applicant: RICOH COMPANY, LTD., Tokyo (JP)

(72) Inventors: Hiromi Sakaguchi, Kanagawa (JP); Hiroshi Gotou, Kanagawa (JP); Itsuro Sasaki, Kanagawa (JP); Ayaka Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,001

(22) Filed: May 19, 2020

(65) Prior Publication Data

US 2020/0377747 A1    Dec. 3, 2020

(30) Foreign Application Priority Data

May 28, 2019   (JP) .............................. JP2019-099461

(51) Int. Cl.
  *B41J 2/21*     (2006.01)
  *C09D 11/30*    (2014.01)
  (Continued)

(52) U.S. Cl.
  CPC .......... *B41J 2/2107* (2013.01); *B41M 5/0023* (2013.01); *C09D 11/033* (2013.01); *C09D 11/102* (2013.01); *C09D 11/30* (2013.01)

(58) Field of Classification Search
  CPC ... C09D 11/107; C09D 11/322; C09D 11/101; C09D 11/326; C09D 11/38; C09D 11/36;
  (Continued)

(56) References Cited

U.S. PATENT DOCUMENTS

2014/0002539 A1   1/2014  Goto et al.
2015/0077480 A1*  3/2015  Fujii ........................ B41J 2/40
                                                              347/86
(Continued)

FOREIGN PATENT DOCUMENTS

JP       2012-207202      10/2012
JP       2012-241135      12/2012
JP       2017-105193       6/2017

OTHER PUBLICATIONS

U.S. Appl. No. 16/751,267, filed Jan. 24, 2020 Hiroshi Gotou, et al.

*Primary Examiner* — Manish S Shah
(74) *Attorney, Agent, or Firm* — Grüneberg and Myers PLLC

(57) ABSTRACT

An ink including water, an organic solvent, and a polyurethane resin particle is provided. A rate of content of a compound having a molecular weight of 1,000 or less and having a structure represented by the following general formula (I) in the ink is 10 ppm or less.

general formula (I)

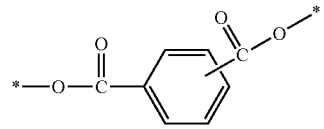

11 Claims, 2 Drawing Sheets

(51) Int. Cl.
  *B41M 5/00* (2006.01)
  *C09D 11/102* (2014.01)
  *C09D 11/033* (2014.01)

(58) Field of Classification Search
  CPC ......... C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 2/0023; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| | | | |
|---|---|---|---|
| 2015/0247049 A1* | 9/2015 | Matsuyama | C09D 11/322 428/207 |
| 2016/0264808 A1* | 9/2016 | Kido | C09D 11/322 |
| 2017/0022381 A1* | 1/2017 | Takamura | C09D 11/322 |
| 2018/0127610 A1* | 5/2018 | Kido | C09D 11/322 |
| 2018/0170061 A1* | 6/2018 | Nakamura | B41J 2/16552 |
| 2018/0320011 A1* | 11/2018 | Kido | B41J 2/01 |

\* cited by examiner

INK, METHOD FOR PRODUCING INK, METHOD FOR PRINTING, AND PRINTER

CROSS-REFERENCE TO RELATED APPLICATIONS

This patent application is based on and claims priority pursuant to 35 U.S.C. § 119(a) to Japanese Patent Application No. 2019-099461, filed on May 28, 2019, in the Japan Patent Office, the entire disclosure of which is incorporated by reference herein.

BACKGROUND

Technical Field

The present disclosure relates to an ink, a method for producing the ink, a method for printing, and a printer.

Description of the Related Art

Inkjet recording methods have rapidly spread in recent years because of ease in recording color images, low running costs, or the like. However, these methods have disadvantages that image defects typified by blur of characters tend to occur depending on a combination of an ink and a recording medium, and image quality is greatly deteriorated.

For example, impermeable media for signages have disadvantages that images remarkably blur and do not fix because the impermeable media do not absorb ink.

In addition, when an image is recorded on a coated paper for commercial printing or publication printing containing a filler such as calcium carbonate and kaolin as a coat layer material, the image remarkably blurs, or gradation is not generated.

Thus, for the purpose of improving drying property and fixity, a hydrophobic organic solvent, e.g. an organic solvent having a solubility parameter (SP) value of 8.9 to 12.0, and a high vapor pressure organic solvent, has been used as an organic solvent, and furthermore an ink composition has shifted to a composition in which more water-dispersible resin particles are used.

In addition, since the impermeable media for signages are poor in ink fixity, a water-dispersible resin particle material is selected, or an addition amount of the water-dispersible resin particle is increased. In particular, to improve the fixity of the ink to an impermeable media film, cases using a large amount of polyurethane resin particle synthesized from a polyol raw material containing an aromatic ring have been increasing.

Although image quality is improved because of the aforementioned change in situation, disadvantages are caused in ink storage stability, liquid permeability, and discharge stability.

SUMMARY

In accordance with some embodiments of the present embodiment, an ink comprising water, an organic solvent, and a polyurethane resin particle is provided. A rate of content of a compound having a molecular weight of 1,000 or less and having a structure represented by the following general formula (I) in the ink is 10 ppm or less.

general formula (I)

BRIEF DESCRIPTION OF THE DRAWINGS

The aforementioned and other aspects, features, and advantages of the present invention would be better understood by reference to the following detailed description when considered in connection with the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present invention are described below. In the drawings for explaining the following embodiments, the same reference codes are allocated to elements (members or components) having the same function or shape and redundant descriptions thereof are omitted below.

According to some embodiments of the present invention, an ink having both fixity and liquid permeability is provided.

Since impermeable media for signages are poor in ink fixity, a water-dispersible resin particle material is selected, or an addition amount of the water-dispersible resin particle material is increased. Furthermore, to improve the fixity of the ink to an impermeable media film, cases using a large amount of polyurethane resin particle synthesized from a polyol raw material containing an aromatic ring, having a structure represented by the following general formula (I), have been increasing.

general formula (I)

However, the polyol raw material containing an aromatic ring, having the structure represented by general formula (I), that is used as a raw material for the polyurethane resin particle, contains a substance having the structure represented by general formula (I) as a by-product which is hard to dissolve in water and a water-soluble solvent.

When an ink produced using the polyurethane resin particle is put into an ink pack and allowed to stand and stored at room temperature (25±5° C.) for a month or longer, a cyclic ester compound having the structure represented by general formula (I) is eluted from the polyurethane resin particle, and a compound having the structure represented by general formula (I) is crystallized and precipitated in the ink. It has been found that the precipitation of the crystal in the ink deteriorates liquid permeability and furthermore destabilizes discharge.

The substance having the structure represented by general formula (I) contained in the ink is supposed to contain raw materials used for producing the polyurethane resin and/or by-products of the raw materials. Examples of such a substance include, but are not limited to, a cyclic ester represented by the following structural formula A.

structural formula A where R represents an alkylene, which normally has 3 to 10 carbon atoms.

The raw materials and by-products which have not been removed in purification and production processes of the ink remain contained in the ink. It has been found that the substance having the structure represented by general formula (I) gets crystallized in the ink with time.

The inventors of the present invention have found that an object of the present invention is achieved when a rate of content of the compound having the structure represented by general formula (I) in the ink is less than 10 ppm based on the whole ink.

In addition, the ink according to an embodiment of the present invention has high fixity and drying property with respect to an impermeable medium for signage and a commercial printing paper, as well as high image density, high liquid permeability and discharge stability, and excellent storage stability.

The cyclic ester having the structure represented by general formula (I) is normally water-insoluble. Even in a case in which the cyclic ester having the structure represented by general formula (I) is not detected in the water content of the aqueous dispersion of the polyurethane resin particle, when the ink is produced by mixing the aqueous dispersion of the polyurethane resin particle and another component such as an organic solvent, a crystal of the cyclic ester having the structure represented by general formula (I) may be precipitated in the ink. It is presumed that this is because the cyclic ester having the structure represented by general formula (I) contained in the polyurethane resin particle gets eluted and crystallized when being mixed with the organic solvent.

It has been found that in a case in which the ink contains 10 ppm or more of the compound having the structure represented by general formula (I), after the ink has been stored at 30° C. or lower for 1 month or longer, a crystal gets precipitated in the ink, resulting in disadvantages of liquid permeability and dischargeability. Also, it has been confirmed that, as long as the rate of content of the compound having the structure represented by general formula (I) in the ink is less than 10 ppm, there is no practical disadvantage. Herein, the rate of content being less than 10 ppm based on the whole ink refers to the rate of content of the crystal being lower than 0.001% by mass based on the total mass of the ink.

Furthermore, it has been found that when the compound having the structure represented by general formula (I) is stored for a long time in the raw material polyol, the aqueous dispersion of the polyurethane resin particle, or the ink, the compound gets precipitated as a crystal. Therefore, the rate of content of the crystal in the raw material or the ink can be reduced by removing the crystal through filtration after a long-term storage. It has also been found that there was no practical disadvantage after the amount of the crystallized and precipitated compound in the ink has been reduced. For sufficiently precipitating the crystal, it is preferable that the ink be stored for 6 months or longer in a case of room temperature (25° C.±5° C.).

Also, it has been found that when a small amount of alkaline solvent is added into the aqueous dispersion of the polyurethane resin particle or the ink, crystal precipitation can be prevented due to hydrolysis of an ester bond.

In the present disclosure, the compound having the structure represented by general formula (I) can be quantified by e.g. gas chromatography-mass spectrometry (GC-MS) analysis or liquid chromatography-mass spectrometry (LC-MS) analysis as follows.

The ink is separated into a supernatant and a precipitate by centrifugation, then the precipitate and the supernatant are collected. The precipitate is repeatedly washed with an organic solvent (e.g. tetrahydrofuran (THF)) and filtrated to collect the compound having the structure represented by general formula (I). The collected compound is subjected to the GC-MS analysis under the following conditions to confirm that the collected compound is the compound having the structure represented by general formula (I) and that the molecular weight thereof is 1,000 or less.

The supernatant is also subjected to the GC-MS analysis to confirm that the compound having the structure represented by general formula (I) is contained and that the molecular weight thereof is 1,000 or less. Thus, the rate of content of the compound having the structure represented by general formula (I) in the ink can be calculated.

Centrifugation
  Apparatus: himac CS150GX manufactured by Hitachi Koki Co., Ltd.
  Rotational speed: 150,000 rpm
  Time of rotation: 1 hour GC-MS
  Apparatus: QP5000 manufactured by SHIMADZU CORPORATION Column: Ultra ALLOY-5L=30 m, ID=0.25 mm, Film=0.25 µm Temperature rising in column: 50° C. to 330° C.

Flow rate in column: 1.0 ml/min

Split: 1:100

Ionization method: electron ionization (EI) method (70 eV)

Measurement mass range: m/z 33 to 600

Data analysis, analysis software: GCMSsolution manufactured by SHIMADZU CORPORATION Ink Hereinafter, an organic solvent, water, a colorant, a resin, additives, and the like used for the ink will be explained.

Organic Solvent

The organic solvent used in the present disclosure is not particularly limited, and a water-soluble organic solvent can be used. Examples of the water-soluble organic solvent include, but are not limited to: a polyhydric alcohol; an ether such as a polyhydric alcohol alkyl ether and a polyhydric alcohol aryl ether; a nitrogen-containing heterocyclic compound; an amide; an amine; and a sulfur-containing compound.

Specific examples of the water-soluble organic solvent include, but are not limited to: a polyhydric alcohol such as ethyleneglycol, diethyleneglycol, 1,2-propanediol, 1,3-propanediol, 1,2-butanediol, 1,3-butanediol, 1,4-butanediol, 2,3-butanediol, 3-methyl-1,3-butanediol, triethyleneglycol, polyethyleneglycol, polypropyleneglycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerol, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; a polyhydric alcohol alkylether such as ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, and propyleneglycol monoethyl ether; a polyhydric alcohol aryl ether such as ethyleneglycol monophenyl ether and ethyleneglycol monobenzyl ether; a nitrogen-containing heterocyclic compound such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; an amide such as formamide, N-methylformamide, N,N-dimethylformamide, 3-methoxy-N,N-dimethylpropionamide, and 3-butoxy-N,N-dimethylpropionamide; an amine such as monoethanolamine, diethanolamine, and triethylamine; a sulfur-containing compound such as dimethylsulfoxide, sulfolane, and thiodiethanol; propylene carbonate; and ethylene carbonate.

It is preferable to use an organic solvent having a boiling point of 250° C. or lower because such an organic solvent not only functions as a wetting agent but also provides a good drying property.

A polyol compound having 8 or more carbon atoms and a glycol ether compound are also preferably used. Specific examples of the polyol compound having 8 or more carbon atoms include, but are not limited to, 2-ethyl-1,3-hexanediol, and 2,2,4-trimethyl-1,3-pentanediol. Specific examples of the glycol ether compound include, but are not limited to: a polyhydric alcohol alkyl ether such as ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, and propyleneglycol monoethyl ether; and a polyhydric alcohol aryl ether such as ethyleneglycol monophenyl ether and ethyleneglycol monobenzyl ether.

A solubility parameter (SP value) defined in accordance with the regular solution theory introduced by Hildebrand is a criterion for a solubility of a two-component solution. The SP value described in the present disclosure is a value calculated in accordance with the Fedors method. In addition, the SP value is indicated by a square root of a cohesive energy density in the regular solution theory, with a unit of $(cal/cm^3)^{0.5}$. Generally, the SP value can be calculated by a widely-used simple software program.

Examples of a solvent having an SP value of 10 or lower include, but are not limited to: 3-methoxy-N'N-dimethylpropanamide (SP value: 9.2), isopropylidene glycerol (SP value: 9.8), 3-methoxy-1-butanol (SP value: 10.0), dipropyleneglycol monopropyl ether (SP value: 9.5), tripropyleneglycol monomethyl ether (SP value: 9.4), diethyleneglycol diethyl ether (SP value: 8.2), and triethyleneglycol butyl methyl ether (SP value: 8.4).

Preferably, the ink set according to the present disclosure has a solvent composition such that the rate of content of the solvent having an SP value of 10 or lower in the ink is 5% by mass or more, for achieving a high effect of both color unevenness improvement and color reproducibility. When the rate of content of a solvent having a low SP value is high, permeability of a medium is increased, and therefore fixity to an impermeable medium becomes better.

Water

A rate of content of water in the ink is not particularly limited, and can be appropriately selected depending on the intended purpose. However, the rate of content is preferably 10% by mass or more and 90% by mass or less, more preferably 20% by mass or more and 60% by mass or less, for drying property and discharge reliability of the ink.

Colorant

The colorant is not particularly limited, and a pigment and a dye can be used. As the pigment, an inorganic pigment or an organic pigment can be used. These pigments may be used alone or in combination. Also, a mixed crystal may be used.

As the pigment, e.g. a black pigment, a yellow pigment, a magenta pigment, a cyan pigment, a white pigment, a green pigment, an orange pigment, a glossy color pigment such as gold and silver, a metallic pigment, and the like can be used.

As the inorganic pigment, titanium oxide, iron oxide, calcium carbonate, barium sulfate, aluminum hydroxide, barium yellow, cadmium red, and chrome yellow, as well as a carbon black produced by a known method such as a contact method, a furnace method, and a thermal method can be used.

In addition, as the organic pigment, an azo pigment, a polycyclic pigment (e.g. a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like), a dye chelate (e.g. a basic dye type chelate, an acidic dye type chelate, and the like), a nitro pigment, a nitroso pigment, aniline black, and the like can be used. Above all, a pigment having a high affinity with the solvent is preferably used. In addition, a hollow resin particle and a hollow inorganic particle can also be used.

Specific examples of the black pigment include, but are not limited to, a carbon black (Color Index (C. I.) Pigment Black 7) such as furnace black, lamp black, acetylene black, and channel black, a metal such as copper, iron (C. I. Pigment Black 11), and titanium oxide, and an organic pigment such as aniline black (C. I. Pigment Black 1).

Furthermore, examples of the color pigment include, but are not limited to, C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, 213, C. I. Pigment Orange 5, 13, 16, 17, 36, 43, 51, C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, 264, C. I. Pigment Violet 1 (Rhodamine Lake), 3, 5:1, 16, 19, 23, 38, C. I. Pigment Blue 1, 2, 15 (Phthalocyanine Blue), 15:1, 15:2, 15:3, 15:4 (Phthalocyanine Blue), 16, 17:1, 56, 60, 63, and C. I. Pigment Green 1, 4, 7, 8, 10, 17, 18, 36.

The dye is not particularly limited. For the dye, an acidic dye, a direct dye, a reactive dye, and a basic dye may be used, and may be used alone or in combination.

Examples of the dye include, but are not limited to, C. I. Acid Yellow 17, 23, 42, 44, 79, 142, C. I. Acid Red 52, 80, 82, 249, 254, 289, C. I. Acid Blue 9, 45, 249, C. I. Acid Black 1, 2, 24, 94, C. I. Food Black 1, 2, C. I. Direct Yellow 1, 12, 24, 33, 50, 55, 58, 86, 132, 142, 144, 173, C. I. Direct Red 1, 4, 9, 80, 81, 225, 227, C. I. Direct Blue 1, 2, 15, 71, 86, 87, 98, 165, 199, 202, C. I. Direct Black 19, 38, 51, 71, 154, 168, 171, 195, C. I. Reactive Red 14, 32, 55, 79, 249, and C. I. Reactive Black 3, 4, 35.

For the purpose of dispersing the pigment to obtain an ink, a method of introducing a hydrophilic functional group into a pigment to obtain a self-dispersible pigment, a method of coating a surface of a pigment with a resin and dispersing the pigment, a method of dispersing the pigment using a dispersant, or the like may be used.

Examples of the method of introducing the hydrophilic functional group into the pigment to obtain the self-dispersible pigment include, but are not limited to, a method in which a functional group such as a sulfone group and a carboxyl group is added to a pigment (e.g. carbon) to allow the pigment to be dispersed in water.

Examples of the method of coating the surface of the pigment with the resin and dispersing the pigment include, but are not limited to, a method in which the pigment is incorporated by a microcapsule to allow the pigment to be dispersed in water. This pigment can be rephrased as a resin-coated pigment. In this case, the whole pigment blended in the ink is not necessarily coated with the resin, and uncoated pigments or partially coated pigments may be dispersed in the ink as long as the effect of the present disclosure is not impaired.

Examples of the method of dispersing the pigment using the dispersant include, but are not limited to, a method of dispersing the pigment using a known low-molecular type dispersant or high-molecular type dispersant typified by surfactants.

As the dispersant, e.g. an anionic surfactant, a cationic surfactant, an amphoteric surfactant, a nonionic surfactant or the like can be used depending on the pigment.

Also, RT-100 (nonionic surfactant) manufactured by TAKEMOTO OIL & FAT Co., Ltd. and a formalin condensate of sodium naphthalenesulfonate can be suitably used as a dispersant. The dispersant may be used alone or in combination.

Pigment Dispersion

An ink can be obtained by blending materials such as water and an organic solvent with a pigment. Also, a pigment dispersion prepared by mixing a pigment with other components such as water and a dispersant can be blended with materials such as water and an organic solvent to produce an ink.

The pigment dispersion is obtained by mixing and dispersing water, a pigment, a pigment dispersant and optionally other components, and adjusting a particle diameter of the pigment. Preferably, the dispersion is performed by a disperser.

The particle diameter of the pigment in the pigment dispersion is not particularly limited. However, the diameter of the highest-frequency particle in terms of the number of particles is preferably 20 nm or more and 500 nm or less, more preferably 20 nm or more and 150 nm or less from the viewpoints of preferable dispersion stability of the pigment, high discharge stability, and high image quality such as image density. The particle diameter of the pigment can be measured using a particle size analyzer (Nanotrac Wave-UT151, manufactured by MicrotracBEL Corp.).

A rate of content of the pigment in the pigment dispersion is not particularly limited, and can be appropriately selected depending on the intended purpose. However, the rate of content is preferably 0.1% by mass or more and 50% by mass or less, more preferably 0.1% by mass or more and 30% by mass or less from the viewpoints of good discharge stability and high image density.

Preferably, the pigment dispersion is optionally filtered to remove coarse particles by a filter, a centrifuge or the like, and degassed.

Water-Dispersible Resin Particle

A water-dispersible resin particle having excellent film formability (image-forming property), solvent resistance, high water resistance, and high weather resistance is useful for recording images with high water resistance and high image density (high color developing property). Examples of such a water-dispersible resin particle include, but are not limited to, a condensed synthetic resin, an added synthetic resin, and a natural polymer compound. In the present disclosure, the ink contains a polyurethane resin particle as the water-dispersible resin particle.

Since impermeable media for signages are poor in ink fixity, the material of the water-dispersible resin particle should be carefully selected, and an addition amount of the water-dispersible resin particle should be increased. The fixity of the ink to a film as an impermeable medium is improved when a polyurethane resin particle synthesized from a polyol raw material containing an aromatic ring, having the structure represented by general formula (I), is used.

Examples of the polyol raw material containing an aromatic ring, having the structure represented by general formula (I), include, but are not limited to, terephthalic acid and isophthalic acid. When terephthalic acid and isophthalic acid are used as raw materials, a cyclic ester compound is produced. It has been confirmed by GC-MS that, when using the above two types of raw materials, a cyclic ester is produced from the mixture of two phthalic acids.

In the present disclosure, it is preferable that the polyurethane resin particle be produced by using the polyol raw material containing an aromatic ring, having the structure represented by general formula (I), as a raw material, and have the structure represented by general formula (I).

A preferred range of a rate of content of the polyurethane resin particle having the structure represented by general formula (I) in the ink is 2.0% by mass or more to 20.0% by mass or less, more preferably 2.8% by mass or more to 15.0% by mass or less, in terms of resin solid content.

When producing the ink according to the present disclosure, the polyurethane resin particle is used in a state of resin particle dispersion. The solid content of the polyurethane resin particle according to the present disclosure refers to an amount of residues remaining as dry solids in the resin dispersion after the resin dispersion has been dried and solidified, i.e. a total amount of the resin in the insoluble state and the resin in the dissolved state in the resin dispersion.

Other examples of the condensed synthetic resin include, but are not limited to, a polyester resin, a polyepoxy resin, a polyamide resin, a polyether resin, a poly(meth)acrylic resin, an acryl-silicone resin, and a fluororesin. Examples of the added synthetic resin include, but are not limited to, a polyolefin resin, a polystyrene-based resin, a polyvinyl alcohol-based resin, a polyvinyl ester-based resin, a polyacrylic acid-based resin, and an unsaturated carboxylic acid-based resin. Examples of the natural polymer compound include, but are not limited to, a cellulose, a rosin, and a natural rubber.

Above all, the polyurethane resin particle is preferable in consideration of the ink fixity. In addition, two or more types of the water-dispersible resins may be used in combination. As the water-dispersible resin, a resin having a hydrophilic group by itself to have self-dispersibility, or a resin having no dispersibility by itself and provided with dispersibility from a surfactant or a resin having a hydrophilic group can be used. Above all, an ionomer of a polyester resin or a polyurethane resin, and a resin particle emulsion obtained by emulsification and suspension polymerization of an unsaturated monomer are most suitable. In the case of emulsion polymerization of the unsaturated monomer, the resin emulsion is obtained by reacting the unsaturated monomer in water to which the unsaturated monomer, a polymerization initiator, a surfactant, a chain transfer agent, a chelating agent, a pH conditioner, and the like are added, therefore the water-dispersible resin can be easily obtained, and the resin constitution can be easily changed, and a desired property can be easily obtained.

Since the water-dispersible resin may be subjected to molecular chain breakage such as dispersion destruction and hydrolysis under a strong alkali or strong acid environment, the pH is preferably 4 to 12, and particularly from the viewpoint of miscibility with a water-dispersible colorant, more preferably 7 to 11, and even more preferably 8 to 10.5.

In addition, the water-dispersible resin has an action of fixing the water-dispersible colorant to a medium and has a function of forming a film at room temperature or higher to improve the fixity of the colorant. Thus, a minimum film forming temperature (MFT) of the water-dispersible resin is preferably 100° C. or lower. In addition, when a glass transition temperature of the water-dispersible resin is −40° C. or lower, the viscosity of the resin film becomes higher, and a tack is caused on a printed matter. Therefore, the glass transition temperature is preferably −30° C. or higher.

A rate of content of the water-dispersible resin in the ink is preferably 0.5 to 20.0% by mass, more preferably 1.0 to 15.0% by mass in terms of solid content.

However, when sufficiently considering a substrate fixity of the colorant to impermeable media for signage and commercial printing paper, a rate of solid content of the polyurethane resin particle in the ink is preferably 3% by mass or higher, and a solid content ratio between the colorant and the polyurethane resin particle is preferably 1.0:(2.0 to 12.0), particularly preferably 1.0:(2.0 to 11.0).

The content of the polyurethane resin particle here refers to the total amount of the polyurethane resin particle contained in the ink.

Additives

A surfactant, an antifoaming agent, an antiseptic and antifungal agent, an antirust agent, a pH conditioner, and the like may be added to the ink as needed.

Surfactant

As the surfactant, any of a silicone-based surfactant, a fluorine-based surfactant, an amphoteric surfactant, a nonionic surfactant, and an anionic surfactant can be used.

The silicone-based surfactant is not particularly limited, and can be appropriately selected depending on an intended purpose. Particularly, a silicone-based surfactant that is not decomposed even at a high pH is preferable, and examples thereof include, but are not limited to, a side chain-modified polydimethylsiloxane, a both end-modified polydimethylsiloxane, a one end-modified polydimethylsiloxane, and a side chain both end-modified polydimethylsiloxane. A modified group having a polyoxyethylene group or a polyoxyethylenepolyoxypropylene group is particularly preferable because of suitable characteristics as an aqueous surfactant. In addition, as the silicone-based surfactant, a polyether-modified silicone-based surfactant can also be used, and examples of the silicone-based surfactant includes, but are not limited to, a compound in which a polyalkylene oxide structure is introduced into an Si side chain of dimethylsiloxane.

As the fluorine-based surfactant, e.g. a perfluoroalkylsulfonic acid compound, a perfluoroalkyl carboxylic acid compound, a perfluoroalkyl phosphate ester compound, and a polyoxyalkylene ether polymer compound having a perfluoroalkyl ethyleneoxide additive and a perfluoroalkyl ether group at side chains are particularly preferable because of low foamability. Examples of the perfluoroalkylsulfonic acid compound include, but are not limited to, a perfluoroalkylsulfonic acid, and perfluoroalkylsulfonate. Examples of the perfluoroalkylcarboxylic acid compound include, but are not limited to, a perfluoroalkylcarboxylic acid, and a perfluoroalkylcarboxylate. Examples of the polyoxyalkylene ether polymer compound having the perfluoroalkyl ether group at a side chain include, but are not limited to, a sulfate ester salt of polyoxyalkylene ether polymer having a perfluoroalkyl ether group at a side chain, and a salt of polyoxyalkylene ether polymer having a perfluoroalkyl ether group at a side chain. Examples of a counter ion of the salts in these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Examples of the amphoteric surfactant include, but are not limited to, lauryl aminopropionate, lauryl dimethyl betaine, stearyl dimethyl betaine, and lauryl dihydroxyethyl betaine. Examples of the nonionic surfactant include, but are not limited to, polyoxyethylenealkylphenyl ether, polyoxyethylenealkyl ester, polyoxyethylenealkylamine, polyoxyethylenealkylamide, polyoxyethylenepropylene block polymer, sorbitan fatty acid ester, polyoxyethylene sorbitan fatty acid ester, and ethylene oxide-added acetylene alcohol. Examples of the anionic surfactant include, but are not limited to, polyoxyethylenealkyl ether acetate, dodecylbenzene sulfonate, laurate, salt of polyoxyethylenealkyl ether sulfate. These anionic surfactants may be used alone or in combination A rate of content of the surfactant in the ink is not particularly limited, and can be appropriately selected depending on the intended purpose. However, the rate of content is preferably 0.001% by mass or more and 5% by mass or less, more preferably 0.05% by mass or more and 5% by mass or less, from the viewpoints of obtaining excellent wettability and discharge stability and improving image quality.

Antifoaming Agent

The antifoaming agent is not particularly limited. Examples of the antifoaming agent include, but are not limited to, a silicone-based antifoaming agent, a polyether-based antifoaming agent, and a fatty acid ester-based antifoaming agent. These antifoaming agents may be used alone or in combination. Above all, the silicone-based antifoaming agent is preferable from the viewpoint of excellent foam breaking effect.

Antiseptic and Antifungal Agent

The antiseptic and antifungal agent is not particularly limited. Examples of the antiseptic and antifungal agent include, but are not limited to, 1,2-benzisothiazolin-3-one.

Antirust Agent

The antirust agent is not particularly limited, and examples of the antirust agent include, but are not limited to, acidic sulfite and sodium thiosulfate.

pH Conditioner

The pH conditioner is not particularly limited as long as the pH can be adjusted to 7 or higher, and examples of the pH conditioner include, but are not limited to, an amine such as diethanolamine and triethanolamine.

The physical properties of the ink are not particularly limited and can be appropriately selected depending on the intended purpose. For example, a viscosity, a surface tension, a pH, and the like are preferably within the following ranges.

The viscosity of the ink at 25° C. is preferably 5 mPa·s or more and 30 mPa·s more less, more preferably 5 mPa·s or more and 25 mPa·s more less from the viewpoints that a character printing density and a character quality are improved and good dischargeability can be obtained. Herein, the viscosity can be measured using e.g. a rotary viscometer (RE-80L manufactured by Toki Sangyo Co., Ltd). The measurement can be implemented under a measurement condition using a standard cone rotor (1°34'×R24), with a sample liquid volume of 1.2 mL, at a rotation speed of 50 rpm, and 25° C., for 3 minutes.

The surface tension of the ink is preferably 35 mN/m or less, more preferably 32 mN/m or less at 25° C. from the viewpoints that the ink can be suitably leveled on a recording medium and a time for drying the ink can be shortened.

The pH of the ink is preferably 7 to 12, more preferably 8 to 11 from the viewpoint of preventing corrosion of a metal member in contact with a liquid.

Ink Producing Method

The ink producing method according to the present disclosure includes a step in which an alkaline solution is added to an aqueous dispersion of the polyurethane resin particle, or a mixture obtained by mixing the aqueous dispersion of the polyurethane resin particle with another ink component, and stirred the resulted mixture at 20° C. or higher. Thereby, a compound having the structure represented by general formula (I) contained in the resin and is hydrolyzed, and therefore the rate of content of the compound having the structure represented by general formula (I) in the ink can be 10 ppm or less, and both fixity and liquid permeability can be achieved.

Although an alkali used to prepare the alkaline solution is not particularly limited, sodium hydroxide or calcium hydroxide is preferably used. The addition amount of the alkali is preferably 0.001 to 0.01 parts by mass with respect to 1 part by mass of the resin solid content for suppression of crystallization and good dispersibility. In addition, the temperature at the stirring is preferably 20° C. or higher. Although a high temperature is more preferred for acceleration of hydrolysis, it is preferable that the stirring is performed at such a temperature that the resin is not deteriorated depending on a heat characteristic of the resin. Although the stirring time can be appropriately adjusted, it is preferable to continue the stirring until the concentration of the compound having the structure represented by general formula (I) in the ink becomes 10 ppm or less.

Additionally, as the ink producing method according to the present disclosure, it is effective that the aqueous dispersion of the polyurethane resin particle, or the mixture of the aqueous dispersion of the polyurethane resin particle and another ink component, is aged (left to stand for a certain period) to precipitate a substance containing the compound having the structure represented by general formula (I), and then the precipitate is removed. Although the aging period can be appropriately adjusted, the aging period is preferably 100 days or longer for sufficient precipitation. In addition, when the aging temperature is too high, a precipitation rate is decreased, and therefore it is preferable to perform the aging under an environment of 40° C. or lower. After the aging, filtration is performed, so that the substance containing the compound having the structure represented by general formula (I) can be removed, and the rate of content of the compound having the structure represented by general formula (I) in the ink can be decreased to 10 ppm or less.

Recording Medium

The recording medium is not particularly limited, and plain paper, glossy paper, special paper, cloth, or the like can be used, but, even when using an impermeable substrate, a good image can be formed.

The impermeable substrate refers to a substrate having a surface with low water permeability and low absorptivity, and includes a material which has many cavities inside but does not have opens to the outside. More quantitatively, the impermeable substrate refers to a substrate in which a water absorption amount from the start of contact with the ink to 30 $msec^{1/2}$ later is 10 $mL/m^2$ or less in Bristow method.

As the impermeable substrate, for example, a plastic film such as a vinyl chloride resin film, a polyethylene terephthalate (PET) film, and a polypropylene, polyethylene, and polycarbonate film can be suitably used.

Recorded Matter

The ink recorded matter according to the present disclosure includes a recording medium and an image formed on the recording medium using the ink according to the present disclosure. The ink recorded matter may be obtained by recording an image by an inkjet recording apparatus and an inkjet recording method.

Recording Apparatus and Recording Method

The ink according to the present disclosure can be suitably used for various recording apparatuses employing an inkjet recording method, e.g. a printer, a facsimile machine, a copying apparatus, a multifunction peripheral combining printer/facsimile machine/copier machine, and a solid object-fabricating apparatus.

In the present disclosure, the recording apparatus and the recording method refer to an apparatus capable of discharging an ink, various treatment liquids, and the like to a recording medium, and a method of performing recording using the apparatus, respectively. The recording medium refers to a medium to which the ink and the various treatment liquids can adhere at least temporarily.

This recording apparatus can include not only a head for discharging the ink but also a device related to feeding, conveyance, and ejecting of the recording medium, as well as apparatuses called a pretreatment apparatus and a post treatment apparatus, and the like.

The recording apparatus and the recording method may have a heating device used in the heating step and a drying device used in the drying step. The heating device and the drying device include e.g. a device for heating and drying a print face or a back face of the recording medium. The heating device and the drying device are not particularly limited, but e.g. a warm air heater or an infrared heater can be used. Heating and drying can be performed before, during, or after printing.

Also, the recording apparatus and the recording method are not limited to apparatuses and methods in which significant images such as characters and figures are visualized by the ink. Examples of the recording apparatus and the recording method include, but are not limited to, apparatuses and methods for forming a pattern such as a geometric pattern or for fabricating a three-dimensional image.

Unless otherwise specified, the recording apparatus includes both a serial type apparatus in which a discharging head is moved, and a line type apparatus in which the discharging head is not moved.

Also, this recording apparatus includes not only a desktop type recording apparatus, but also a wide recording apparatus which allows printing on an A0-size recording medium, and e.g. a continuous paper type printer capable of using a continuous paper wound in a roll shape as a recording medium.

Figure 1:
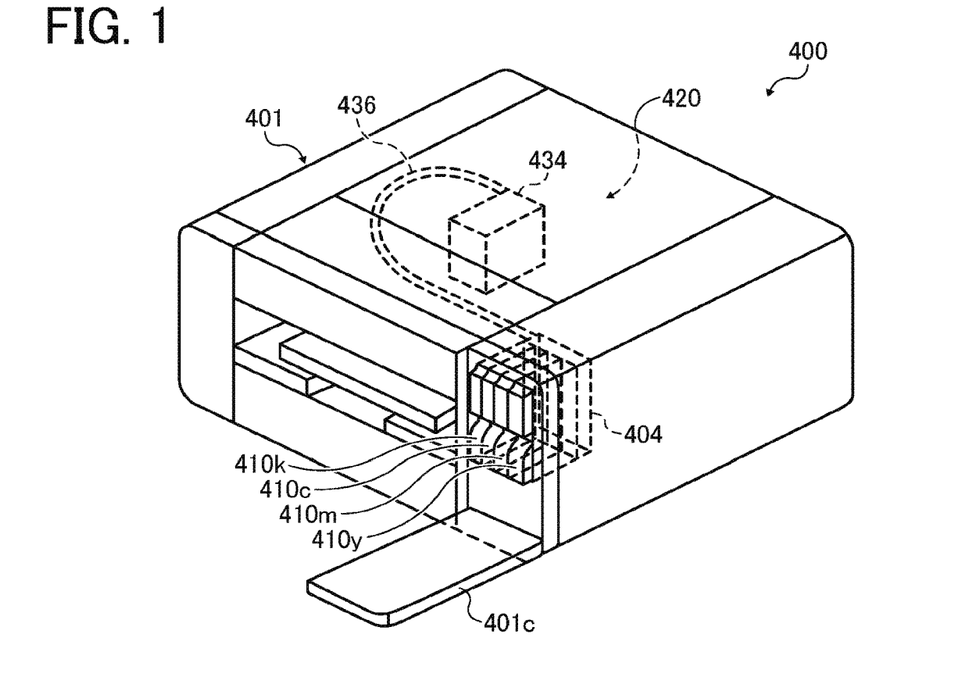
FIG. 1 is a diagram illustrating a printer according to an embodiment of the present invention.
Figure 2:
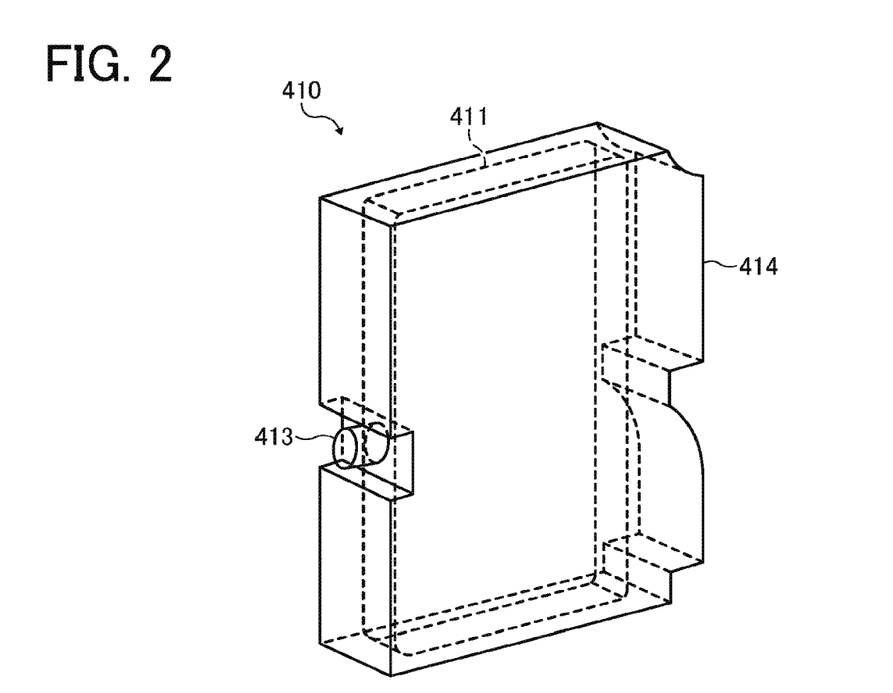
FIG. 2 is a diagram illustrating a main tank for storing an ink according to an embodiment of the present invention.

An example of the recording apparatus will be explained referring to FIG. 1 and FIG. 2. FIG. 1 is a perspective view for description of the apparatus. FIG. 2 is a perspective view for description of the main tank. As an example of the recording apparatus, an image forming apparatus 400 is a serial type image forming apparatus. A mechanism unit 420 is disposed inside an exterior 401 of the image forming apparatus 400. Each ink-storing unit 411 for each color main tank 410 (410k, 410c, 410m, 410y) of black (K), cyan (C), magenta (M), and yellow (Y) is formed from e.g. a packaging member such as an aluminum laminate film. The ink-storing unit 411 is housed in e.g. a plastic container case 414. Thereby, the main tank 410 is used as each color ink cartridge.

On the other hand, when a cover 401c of an apparatus body is opened, a cartridge holder 404 is disposed on an inner back side in the opening. The main tanks 410 are detachably attached to the cartridge holder 404. Thereby, each ink discharging port 413 of the main tanks 410 communicates with each color discharging head 434 through each color supplying tube 436, so that the ink can be discharged from the discharging head 434 to the recording medium. It is preferable that a filter is disposed in the ink flow passage between the ink-storing unit (ink cartridge) 411 and the discharging head (discharging device for discharging the ink) 434 in FIG. 1. In addition, the filter may also be disposed on the ink discharging port 413. Preferably, the filter can hold particles of 10 μm or larger. Disposition of the filter makes it possible to remove particles of 10 μm or larger and to provide a printer having excellent discharge stability.

Since the filter is in contact with the ink all the time, the filter is preferably made of stainless steel for corrosion resistance. Above all, an austenite-based stainless steel is preferable, and particularly SUS304, SUS316, or SUS316L is more preferable because of excellent corrosion resistance. Incidentally, any one selected from SUS304, SUS316, and SUS316L is preferably contained in the filter, but more preferably constitutes the filter.

In addition, as the filter, filters having different filtration precisions are commercially available. For example, Acro Last Chance Filter manufactured by Nihon Pall Ltd. can be used. Use of a filter having a filtration precision of 10 μm or smaller is preferable because a solid content in the ink can be removed and the discharge stability can be improved. Use of a filter having a filtration precision of 6 μm or more and 10 μm or less is preferable because the ink is suitably supplied to the discharging device.

Specific examples of the product of the filter include, but are not limited to, 10 μm Dispofilter (PALL ACRO 25 LCF-12100), having a filtration precision of 10 μm, made of polypropylene. When using a printer in which a filter is disposed in the ink flow passage between the ink cartridge and the discharging device for discharging the ink, crystals having particle diameters of e.g. larger than 10 μm in the ink can be removed, achieving suitable discharge stability.

When the rate of content of the compound having the structure represented by general formula (I) in the ink is set to less than 10 ppm, the ink has a high fixity, a high drying property, a high image density, a good liquid permeability, a good discharge stability, and an excellent storage stability. Incidentally, even when large crystals having particle diameters of larger than 10 μm remain in the ink, suitable discharge stability can be achieved by removing large crystals through the filter.

In addition, a shape of the filter used in the present disclosure is not particularly limited, and any of known filters can be used. Above all, use of a sintered filter obtained by laminating and sintering a stainless steel fiber in a felt form, or a twilled filter formed by twilling a stainless steel fiber is desirable because an inkjet recording apparatus (ink-supplying unit) having a longer-term discharge reliability can be obtained.

Recording Apparatus

Figure 3:
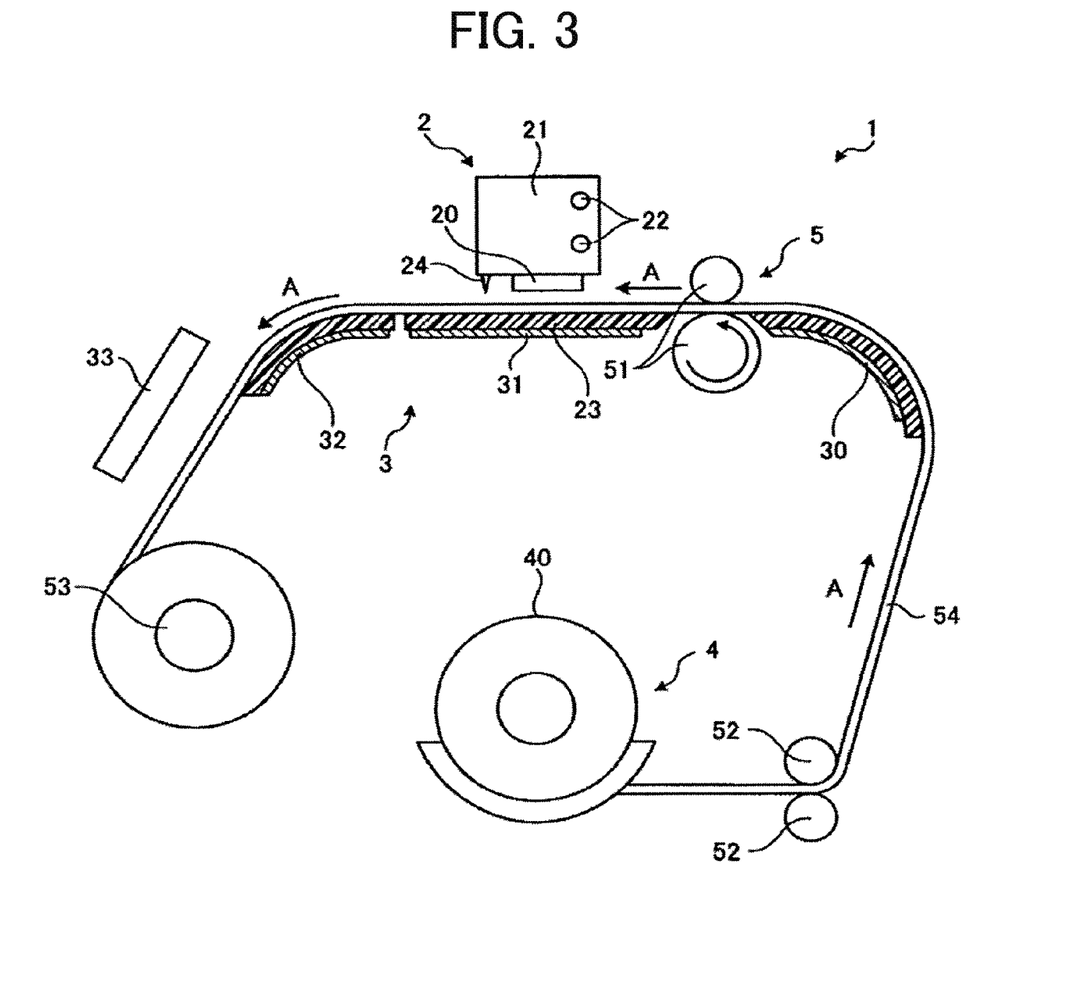
FIG. 3 is a diagram illustrating a printer according to an embodiment of the present invention.

FIG. 3 is a schematic diagram illustrating a configuration of an inkjet recording apparatus 1. The inkjet recording apparatus 1 as a printer is a serial type inkjet recording apparatus. As illustrated in FIG. 3, an inkjet recording apparatus 1 includes an image forming unit 2 for printing a desired image, a drying apparatus 3, a roll medium-storing unit 4, and a conveyance mechanism 5. The roll medium-storing unit 4 stores a roll medium (recording medium) 40. Incidentally, the roll medium-storing unit 4 can store recording media 40 having different width direction sizes. The recording medium 40 may be an impermeable medium such as a PVC (polyvinyl chloride) film and a PET (polyethylene terephthalate) film, as well as a permeable medium such as a cloth and a synthetic paper.

The conveyance mechanism 5 contains a roll-to-roll type conveyance device. The conveyance mechanism 5 includes a pair of nip rollers 51, a pair of driven rollers 52, and a winding roller 53 on a conveyance path 54 of the recording medium 40. The nip rollers 51 are disposed on the front side of the image forming unit 2 (upstream side in a conveyance direction A). The nip rollers 51 rotate in association with driving of the motor to convey the recording medium 40 sandwiched by the nip rollers 51 toward the image forming unit 2. In addition, the winding roller 53 rotates in association with driving of a motor to wind the recording medium 40 after printing. The driven rollers 52 rotate following conveyance of the recording medium 40.

The conveyance mechanism 5 has a wheel encoder for detecting a conveyance speed. In the conveyance mechanism 5, a conveyance speed is controlled by controlling the motor on the basis of a desired value and a speed detection value obtained by sampling a pulse detected from a wheel encoder 55.

That means, the recording medium 40 housed in the roll medium-storing unit 4 is conveyed to the image forming unit 2 by rotation of the nip roller 51 via the driven roller 52. Once the recording medium 40 reaches the image forming unit 2, a desired image is printed on the recording medium 40 by the image forming unit 2. Then, the recording medium 40 after printing is supposed to be wound by rotation of the winding roller 53.

The image forming unit 2 includes a carriage 21. The carriage 21 is slidably held by a guide rod (guide rail) 22. The carriage 21 moves on the guide rod (guide rail) 22 in a direction orthogonal to the conveyance direction A of the recording medium 40 (main scanning direction) in association with driving of the motor. More particularly, the carriage 21 reciprocates within a recording region where the image forming unit 2 can make printing on the recording medium 40 conveyed by the conveyance mechanism 5, in a main scanning region which is a main scanning direction-movable region.

The carriage 21 is equipped with a recording head 20 where a plurality of nozzle holes as discharge ports for discharging droplets are arranged. Incidentally, the recording head 20 integrally includes a tank for supplying the ink to the recording head 20. However, the recording head 20 is not limited to the head integrally including the tank, and may be a head separately equipped with the tank. The recording head 20 functions as a liquid discharging unit, which discharges respective color ink droplets of black (K), yellow (Y), magenta (M), and cyan (C) as recording liquids for process colors. The black (K), yellow (Y), magenta (M), and cyan (C) inks are inks for forming images.

The image forming unit 2 includes a platen 23 for supporting the recording medium 40 from under the recording head 20 when printing is made on the recording head 20.

In addition, the image forming unit 2 includes an encoder sheet for detecting a main scanning position of the carriage 21 along the main scanning direction of the carriage 21. In addition, the carriage 21 includes an encoder. In the image forming unit 2, the encoder of the carriage 21 reads the encoder sheet to detect the main scanning position of the carriage 21.

The carriage 21 includes a sensor 24 for optically detecting an end portion of the recording medium 40 following movement of the carriage 21. Signals detected by the sensor 24 are used for calculating a position of the end portion of the recording medium 40 in the main scanning direction, and a width of the recording medium 40.

The drying apparatus 3 includes a preheater 30, a platen heater 31, a drying heater 32, and a warm air fan 33. The preheater 30, the platen heater 31, and the drying heater 32 are electric heaters using e.g. a ceramic or a nichrome wire.

The preheater 30 is disposed on the upstream side relative to the image forming unit 2 in the conveyance direction A of the recording medium 40. The preheater 30 preliminarily heats the recording medium 40 conveyed by the conveyance mechanism 5.

The platen heater 31 is disposed on the platen 23. The platen heater 31 heats the recording medium 40 for landing ink droplets jetted from a nozzle hole of the recording head 20.

The drying heater 32 is disposed on the downstream side relative to the image forming unit 2 in the conveyance direction A of the recording medium 40. The drying heater 32 continuously heats the recording medium 40 to which an image is printed by the image forming unit 2 to enhance the drying of the landed ink droplets.

The warm air fan 33 is disposed on the downstream side relative to the drying heater 32 (image forming unit 2) in the conveyance direction A of the recording medium 40. The warm air fan 33 blows warm air against the recording face of the recording medium 40 to which the ink is landed. The warm air fan 33 decreases a humidity of the atmosphere around the recording face of the recording medium 40 to completely dry the recording face by directly applying hot air against the ink on the recording face of the recording medium 40.

Mounting such a drying apparatus 3 makes the inkjet recording apparatus 1 possible to use an impermeable medium such as a polyvinyl chloride film, a polyethylene terephthalate (PET) film, and an acryl film, each of which does not permeate the ink, as the recording medium 40. In the inkjet recording apparatus 1, the carriage 21 reciprocates in the width direction of the recording medium 40, meanwhile the recording head 20 discharges the ink to form an image. The inkjet recording apparatus 1 performs a unidirectional printing in which the ink is discharged to form an image only when the carriage motion is on an outward path, and a bidirectional printing in which the ink is discharged to form an image when the carriage motion is on both the outward path and a return path. The inkjet recording apparatus 1 mainly performs the bidirectional printing which is advantageous in a printing speed. Incidentally, herein, a motion that the ink is discharged from the recording head 20 while the carriage 21 moves in the main scanning direction is defined as one scanning.

For the control configuration of the inkjet recording apparatus 1, for example, description in Japanese Unexamined Patent Application Publication No. 2017-105193 can be referred. In the present disclosure, the terms such as "image formation", "recording", and "printing", and the like are all synonymous with each other.

The terms such as "recording medium", "media", and "print media" in the present disclosure are all synonymous with each other.

EXAMPLES

Hereinafter, the present invention will be more specifically explained with reference to Examples. However, the present invention is not limited to Examples. In the following description, the "parts" means "parts by mass", and the "%" means "% by mass".

Preparation of Pigment Dispersion

Preparation of Cyan Pigment Dispersion

A cyan pigment dispersion was obtained in the same method as described in —Method A— in Pigment Surface Reforming Treatment in Japanese Unexamined Patent Application Publication No. 2012-207202.

Specifically, 20 g of C.I. Pigment Blue 15:3 (trade name: CHROMOFINE BLUE, manufactured by Dainichiseika Color & Chemicals Mfg. Co., Ltd.), 20 mmol of compound represented by the following structural formula (B), and 200 mL of ion-exchanged water were mixed in Silverson mixer (6,000 rpm (0.6%)) at room temperature to obtain a slurry. When the obtained slurry was at higher than pH 4, 20 mmol of nitric acid was added. After 30 minutes, sodium nitrite (20 mmol) dissolved in a small amount of ion-exchanged water was slowly added to the slurry. Furthermore, the slurry was heated to 60° C. while stirring and reacted for 1 hour. A reformed pigment was obtained, in which the compound represented by the following structural formula (B) was added to the surface of the C.I. Pigment Blue 15:3. Subsequently, the pigment was adjusted to pH 10 with an aqueous NaOH solution, and after 30 minutes, a reformed pigment dispersion was obtained. The reformed pigment dispersion and ion-exchanged water were ultrafiltered using a dialysis membrane, and further ultrasonically dispersed to obtain a cyan pigment dispersion (self-dispersible) having a pigment concentration of 15% and having a bisphosphonic acid group as a hydrophilic functional group.

structural formula (B)

Preparation of Magenta Pigment Dispersion

A magenta pigment dispersion with a pigment concentration of 15% was prepared in the same manner as in the preparation of the cyan pigment dispersion except that 20 g of C.I. Pigment Blue 15:3 in the preparation of the cyan pigment dispersion was changed to 20 g of C.I. Pigment Red 122 (trade name: Toner Magenta EO02, manufactured by Clariant Japan K.K.).

Preparation of Yellow Pigment Dispersion

A yellow pigment dispersion with a pigment concentration of 15% was prepared in the same manner as in the preparation of the cyan pigment dispersion except that 20 g of C.I. Pigment Blue 15:3 in the preparation of the cyan pigment dispersion was changed to 20 g of C.I. Pigment Yellow 74 (trade name: FAST YELLOW 531, manufactured by Dainichiseika Color & Chemicals Mfg.Co.,Ltd.).

Preparation of Black Pigment Dispersion

A black pigment dispersion with a pigment concentration of 15% was prepared in the same manner as in the preparation of the cyan pigment dispersion except that 20 g of C.I. Pigment Blue 15:3 in the preparation of the cyan pigment dispersion was changed to 20 g of Carbon Black (NIPEX160, manufactured by Degussa AG). A median diameter (D50) of the black pigment was 104 nm.

Example of Preparing Resin Particle

Preparation of Water-Dispersible Polyurethane Resin Particle (A)

Preparation of Polyester Polyol P-1

While introducing nitrogen gas in a reaction vessel equipped with a thermometer, a nitrogen gas introduction tube, and a stirrer, 830 parts of terephthalic acid, 830 parts of isophthalic acid, 374 parts of ethylene glycol, 598 parts of neopentylglycol, and 0.5 part of dibutyltin oxide were put into the reaction vessel, and polycondensed at 230° C. for 15 hours so that an acid value was 1 or lower at 180 to 230° C., to obtain a polyester polyol P-1 having a hydroxyl value of 74.5, an acid value of 0.2, and an average molecular weight of 1,500.

Preparation of Hydrophobic Polyester Polyol Q-1

While introducing nitrogen gas in a reaction vessel equipped with a thermometer, a nitrogen gas introduction tube, and a stirrer, 1,660 parts of orthophthalic acid, 1,637 parts of diethylene glycol, and 0.5 part of dibutyltin oxide were put into the reaction vessel, and polycondensed at 230° C. for 15 hours so that an acid value was 1 or lower at 180 to 230° C., to obtain a polyester polyol Q-1 having a hydroxyl value of 190 and an acid value of 0.3 and having an aromatic ring structure.

Preparation of Water-Dispersible Polyurethane Resin Particle (A)

1,000 parts of polyester polyol P-1 was dehydrated under reduced pressure at 100° C., then cooled to 80° C., to which 907 parts of methylethylketone was added and dissolved by sufficient stirring, and to this mixture, 80 parts of 2,2'-dimethylol propionic acid was added, and subsequently 281 parts of isophorone diisocyanate was added and reacted at 75° C. for 8 hours for conducting urethanization.

After confirming that an isocyanate value became 0.1% or lower, the mixture was cooled to 50° C., to which 340 parts of the aforementioned polyester polyol Q-1 was added to prepare a homogeneous solution, and then, to this solution, 6 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for concentration adjustment to obtain a stable semitransparent colloidal aqueous dispersion of the water-dispersible polyurethane resin particle (A) having 25% of solid content.

Preparation of Water-dispersible Polyurethane Resin Particle (B)

1,000 parts of the aforementioned polyester polyol P-1 was dehydrated under reduced pressure at 100° C., then cooled to 80° C., to which 907 parts of methylethylketone was added, and dissolved by sufficient stirring, and to this mixture, 80 parts of 2,2'-dimethylol propionic acid was added, and subsequently 21 parts of isophorone diisocyanate was added and reacted at 75° C. for 8 hours for conducting urethanization.

After confirming that an isocyanate value became 0.1% or lower, the mixture was cooled to 50° C., to which 60 parts of triethylamine was added for neutralization, and then 7,000 parts of water was added to dissolve the mixture in water.

From the obtained transparent reaction product, methylethylketone was removed under reduced pressure at 40 to 60° C., and then, to the reaction product, water was added for concentration adjustment to obtain a stable semitransparent colloidal aqueous dispersion of a water-dispersible polyurethane resin particle (B) having 25% of solid content.

Preparation of Water-Dispersible Polyurethane Resin Particle (C)

Preparation of Polyester Polyol P-2

While introducing nitrogen gas in a reaction vessel equipped with a thermometer, a nitrogen gas introduction tube, and a stirrer, 664 parts of terephthalic acid, 631 parts of isophthalic acid, 472 parts of 1,4-butanediol, 447 parts of neopentylglycol, and 0.5 part of dibutyltin oxide were put into the reaction vessel, and esterified at 180 to 230° C. for 5 hours, and then polycondensed at 230° C. for 6 hours until an acid value became 1 or lower. Subsequently, the mixture was cooled to 120° C., to which 321 parts of adipic acid, and 268 parts of 2,2'-dimethylol propionic acid were added. The mixture was heated to 170° C. and reacted again at 170° C. for 20 hours to obtain a polyester polyol P-2 having an acid value of 46.5 and a hydroxyl value of 59.8 and having a carboxyl group.

Preparation of Water-Dispersible Polyurethane Resin Particle (C)

1,000 parts of polyester polyol P-2 was dehydrated under reduced pressure at 100° C., then cooled to 80° C., to which 812 parts of methylethylketone was added and dissolved by sufficient stirring, and to this mixture, 20 parts of 1,4'-butanediol was added, and subsequently 198 parts of dicyclohexylmethane-4,4'-diisocyanate (hydrogenated MDI) was added and reacted at 75° C. for 8 hours.

After confirming that an isocyanate value became 0.1% or lower, the mixture was cooled to 50° C., to which 84 parts of triethylamine was added for neutralization, and then 7,000 parts of water was added to dissolve the mixture in water.

From the obtained transparent reaction product, methylethylketone was removed under reduced pressure at 40 to 60° C., and then, to the reaction product, water was added for concentration adjustment to obtain a stable semitransparent colloidal aqueous dispersion of a water-dispersible polyurethane resin particle (C) having 25% of solid content.

Preparation of Water-Dispersible Polyurethane Resin Particle (D)

1,000 parts of polyester polyol P-1 was dehydrated under reduced pressure at 100° C., then cooled to 80° C., to which 907 parts of methylethylketone was added and dissolved by sufficient stirring, and to this mixture, 80 parts of 2,2'-dimethylol propionic acid was added, and subsequently 281 parts of isophorone diisocyanate was added and reacted at 75° C. for 8 hours for conducting urethanization.

After confirming that an isocyanate value became 0.1% or lower, the mixture was cooled to 50° C., to which 60 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for concentration adjustment to obtain a stable semitransparent colloidal aqueous dispersion of a water-dispersible polyurethane resin particle (D) having 25% of solid content.

Preparation of Acryl-Silicone Polymer Resin Particle A

Inside of a 1 L flask equipped with a mechanical stirrer, a thermometer, a nitrogen gas introduction tube, a reflux pipe, and a drip funnel was sufficiently nitrogen gas-substituted, to which 350 g of ion-exchanged water and 8.0 g of LATEMUL S180 (reactive anionic surfactant, manufactured by Kao Corporation) were added and mixed, and heated to 65° C. Subsequently, to the mixture, 3.0 g of reaction initiator t-butyl peroxybenzoate and 1.0 g of sodium isoascorbate were added, and after 5 minutes, a mixture of 45 g of methyl methacrylate, 160 g of methacrylic acid-2-ethylhexyl, 5 g of acrylic acid, 45 g of butyl methacrylate, 30 g of cyclohexyl methacrylate, 15 g of vinyltriethoxysilane, 8.0 g of LATEMUL S-180, and 340 g of ion-exchanged water was dripped for 3 hours. Subsequently, the mixture was heated and matured at 80° C. for 2 hours, then cooled to room temperature, and a pH was adjusted to 7 to 8 with sodium hydroxide. Subsequently, ethanol was distilled off by an evaporator, and a water content was adjusted to obtain 730 g of aqueous dispersion of acryl silicone polymer resin particle A having 40% of solid content. A median diameter (D50) of the polymer fine particle in the dispersion was 125 nm according to measurement using a particle size distribution measuring apparatus (Nanotrac UPA-EX150, manufactured by Nikkiso Co., Ltd.).

Example 1

To 12% of the water-dispersible polyurethane resin particle (A) aqueous dispersion, 0.75% of aqueous sodium hydroxide solution (trade name: sodium hydroxide (1 mol/L aqueous solution, manufactured by Tokyo Chemical Industry Co., Ltd.) was added, and stirred while heating at 40° C. for 6 hours. Then, in this aqueous dispersion, 10% of cyan pigment dispersion, 15% of 1,3-butanediol (trade name: 1,3-butanediol, manufactured by DAICEL CHEMICAL INDUSTRIES, LTD.), 5% of 3-methoxy-N,N-dimethylpropionamide (trade name: EQUAMIDE M-100, manufactured by Idemitsu Kosan Co.,Ltd.), 5% of diethyleneglycol diethyl ether (trade name: Hisolve EDE, manufactured by TOHO Chemical Industry Co.,Ltd.), 5% of triethyleneglycol butyl methyl ether (trade name: Hisolve BTM, manufactured by TOHO Chemical Industry Co.,Ltd.), 1% of siloxane compound (trade name: FZ2110, manufactured by Dow Toray Co.,Ltd.), and a filling-up amount of ion-exchanged water (total amount: 100%) were mixed and stirred, and then the mixture was filtered through a membrane filter having an average pore size of 0.8 µm (DISMIC28CP, manufactured by Advantech Co., Ltd.) to obtain an ink 1.

Example 2

An ink 2 was obtained in the same manner as in Example 1 except that the rate of content of the water-dispersible polyurethane resin particle (A) aqueous dispersion was changed to 40%, and the rate of content of the aqueous sodium hydroxide solution (trade name: sodium hydroxide (1 mol/L aqueous solution), manufactured by Tokyo Chemical Industry Co., Ltd.) was changed to 0.25%.

Example 3

The water-dispersible polyurethane resin particle (A) aqueous dispersion was left to stand at 35° C.±5° C. for 200 days, and then, to 40% of this aqueous dispersion, 10% of cyan pigment dispersion, 15% of 1,3-butanediol (trade name: 1,3-butanediol, manufactured by DAICEL CHEMICAL INDUSTRIES, LTD.), 5% of 3-methoxy-N,N-dimethylpropionamide (trade name: EQUAMIDE M-100, manufactured by Idemitsu Kosan Co.,Ltd.), 5% of diethyleneglycol diethyl ether (trade name: Hisolve EDE, manufactured by TOHO Chemical Industry Co.,Ltd.), 5% of triethyleneglycol butyl methyl ether (trade name: Hisolve BTM, manufactured by TOHO Chemical Industry Co.,Ltd.), 1% of siloxane compound (trade name: FZ2110, manufactured by Dow Toray Co.,Ltd.), and a filling-up amount of ion-exchanged water (total amount: 100%) were added and stirred, and then the mixture was filtered through a membrane filter having an average pore size of 0.8 µm (DISMIC28CP, manufactured by Advantech Co., Ltd.) to obtain an ink 3.

Example 4

To 40% of the water-dispersible polyurethane resin particle (A) aqueous dispersion, 10% of cyan pigment dispersion, 15% of 1,3-butanediol (trade name: 1,3-butanediol, manufactured by DAICEL CHEMICAL INDUSTRIES, LTD.), 5% of 3-methoxy-N,N-dimethylpropionamide (trade name: EQUAMIDE M-100, manufactured by Idemitsu Kosan Co.,Ltd.), 5% of diethyleneglycol diethyl ether (trade name: Hisolve EDE, manufactured by TOHO Chemical Industry Co.,Ltd.), 5% of triethyleneglycol butyl methyl ether (trade name: Hisolve BTM, manufactured by TOHO Chemical Industry Co.,Ltd.), 1% of siloxane compound (trade name: FZ2110, manufactured by Dow Toray Co., Ltd.), and a filling-up amount of ion-exchanged water (total amount: 100%) were added and stirred, then the mixture was left to stand at 35° C.±5° C. for 100 days, and then filtered through a membrane filter having an average pore size of 0.8 μm (DISMIC28CP, manufactured by Advantech Co., Ltd.) to obtain an ink 4.

Example 5

To 45% of the water-dispersible polyurethane resin particle (A) aqueous dispersion, 0.01% of calcium hydroxide (trade name: calcium hydroxide, manufactured by FUJIFILM Wako Pure Chemical Corporation) was added, and stirred while heating at 40° C. for 6 hours. Then, in this aqueous dispersion, 7% of cyan pigment dispersion, 15% of 1,3-butanediol (trade name: 1,3-butanediol, manufactured by DAICEL CHEMICAL INDUSTRIES, LTD.), 3-methoxy-N, 5% of N-dimethylpropionamide (trade name: EQUAMIDE M-100, manufactured by Idemitsu Kosan Co., Ltd.), 5% of diethyleneglycol diethyl ether (trade name: Hisolve EDE, manufactured by TOHO Chemical Industry Co.,Ltd.), 5% of triethyleneglycol butyl methyl ether (trade name: Hisolve BTM, manufactured by TOHO Chemical Industry Co.,Ltd.), 1% of siloxane compound (trade name: FZ2110, manufactured by Dow Toray Co.,Ltd.), and a filling-up amount of ion-exchanged water (total amount: 100%) were mixed and stirred, and then the mixture was filtered through a membrane filter having an average pore size of 0.8 μm (DISMIC28CP, manufactured by Advantech Co., Ltd.) to obtain an ink 5.

Examples 6 to 12

The inks 6 to 12 were obtained in the same manner as in Example 1 except that the blending ratios were changed as presented in Table 1.

Comparative Example 1

12% of the water-dispersible polyurethane resin particle (A) aqueous dispersion, 15% of 1,3-butanediol (trade name: 1,3-butanediol, manufactured by DAICEL CHEMICAL INDUSTRIES, LTD.), 5% of 3-methoxy-N,N-dimethylpropionamide (trade name: EQUAMIDE M-100, manufactured by Idemitsu Kosan Co.,Ltd.), 5% of diethyleneglycol diethyl ether (trade name: Hisolve EDE, manufactured by TOHO Chemical Industry Co.,Ltd.), 5% of triethyleneglycol butyl methyl ether (trade name: Hisolve BTM, manufactured by TOHO Chemical Industry Co.,Ltd.), 1% of siloxane compound (trade name: FZ2110, manufactured by Dow Toray Co.,Ltd.), and a filling-up amount of ion-exchanged water (total amount: 100%) were mixed and stirred, and then filtered through a membrane filter having an average pore size of 0.8 μm (DISMIC28CP, manufactured by Advantech Co., Ltd.) to obtain an ink 13.

Comparative Examples 2 to 11

Inks 14 to 23 of Comparative Examples 2 to 11 were obtained in the same manner as Comparative Example 1 except that the blending ratios were changed as presented in Table 2.

Evaluation Method

Liquid Permeability

Each ink was pressure-filtered using a membrane filter having an average pore diameter of 0.8 μm (DISMIC28CP, manufactured by Advantech Co., Ltd.) at an air pressure of 1 kgf/cm², and a liquid permeability of the ink was evaluated from an inclination (attenuation rate) obtained by collinearly approximating a decrease in a filtration rate with respect to a filtration permeation amount, and a maximum filtration rate. Incidentally, as the ink used for evaluating the liquid permeability, an ink after a lapse of 200 days or longer from manufacture of the ink was used. When the liquid permeability was rated as A or B, there is no practical disadvantage.

Evaluation Criteria

Liquid permeability: Good_A<----------------> D_Poor

A: The attenuation rate is lower than $1.5 \times 10^{-3}$/sec, and the maximum filtration rate is 1.0 g/sec or higher.

B: The attenuation rate is lower than $1.5 \times 10^{-3}$/sec, and the maximum filtration rate is lower than 1.0 g/sec.

C: The attenuation rate is $1.5 \times 10^{-3}$/sec or higher and lower than $2.5 \times 10^{-3}$/sec.

D: The attenuation rate is $2.5 \times 10^{-3}$/sec or higher.

Fixity

Using the image forming apparatus presented in FIG. 3, 100% solid chart was printed on a PVC (trade name: GIY-11Z5, manufactured by Lintec Corporation). The printing speed was 25 m²/h. Drying was carried out with the preheater 30 at 50° C., the platen heater 31 at 70° C., the drying heater 32 at 80° C., and the warm air fan 33 at 80° C. The PVC was slit in a lattice shape so as to have 100 grids using a cross-cut jig (spacer) and a cutter described in JIS (Japanese Industrial Standards) 5600-5-6. A transparent tape (No. 405 manufactured by NICHIBAN CO., LTD.) is stuck on a measurement portion, and then peeled off. Evaluation was performed in accordance with the rank in JIS standard. When the rank was rated as 0 or 1, there is no practical disadvantage.

Evaluation Criteria

Good 0 <----------------->5 Poor

0: Edges of the cuts are completely smooth and all of the grids have no peeling.

1: Intersections between the cuts have some small peeling of the coating. An affected area of the cross-cut portions is clearly not more than 5%.

2: The coating is peeled off along the edges of the cuts and/or on the intersections. An affected area of the cross-cut portions is clearly more than 5% but not more than 15%.

3: The coating is largely peeled off partially or completely along the edges of the cuts, and/or different parts of the grids are partially or completely peeled off. An affected area of the cross-cut portions is clearly more than 15% but not more than 35%.

4: The coating is largely peeled off partially or completely along the edges of the cuts, and/or some parts of the grids are partially or completely peeled off. An affected area of the cross-cut portions is clearly not more than 35%.

5: It is impossible to classify a peeling level even into Class 4.

Method for Identifying and Quantifying Compound Having Structure Represented by General Formula (I)

A method for identifying and quantifying the compound having the structure represented by general formula (I) according to the present disclosure was executed in accordance with the following procedure.

The ink was separated into a supernatant and a precipitate by centrifugation, then the precipitate and the supernatant were collected, and the precipitate was repeatedly washed using THF (tetrahydrofuran free from additives, special grade: manufactured by Hayashi Pure Chemical Ind., Ltd.) and filtered to collect a compound having the structure represented by general formula (I). The collected component was subjected to GC-MS analysis under the following conditions, and confirmed to be the compound having the structure represented by general formula (I). Also, the compound was confirmed to have a molecular weight of 1,000 or less.

Similarly, the supernatant was subjected to GC-MS analysis, and confirmed to be the compound having the structure represented by general formula (I) and to have a molecular weight of 1,000 or less.

In addition, the compound identified to have the structure represented by general formula (I) was collected as a simple substance, and used to prepare samples for creating a calibration curve for determining the concentration. Then, using the calibration curve, a rate of content of the compound in the ink was calculated from a sum of an amount of the compound detected from the precipitate and an amount of the compound collected from the supernatant.

Centrifugation
Apparatus: himac CS150GX manufactured by Hitachi Kofi Co., Ltd.
Rotational speed: 150,000 rpm
Time of rotation: 1 hour GC-MS
Apparatus: QP5000 manufactured by SHIMADZU CORPORATION
Column: Ultra ALLOY-5L=30 m, ID=0.25 mm, Film=0.25 μm
Temperature rising in column: 50° C. to 330° C.
Flow rate in column: 1.0 ml/min
Split: 1:100
Ionization method: electron ionization (EI) method (70 eV)
Measurement mass range: m/z 33 to 600
Data analysis, analysis software: GCMSsolution manufactured by SHIMADZU CORPORATION In addition, using GC-MS analysis and LC-MS analysis+ $C^{13}$-NMR+$H^1$-NMR+FT-IR, the compound was confirmed to have a molecular weight of 1,000 or less and the structure represented by general formula (I) and to be free of other components, and a rate of content of the compound having the structure represented by general formula (I) was determined.

TABLE 1

| | Component | Solid content concentration | SP value (Fedors) | Examples 1 Ink 1 C | 2 Ink 2 C | 3 Ink 3 C | 4 Ink 4 C | 5 Ink 5 C | 6 Ink 6 C |
|---|---|---|---|---|---|---|---|---|---|
| Colorant | Cyan pigment dispersion | 15% | | 10.0 | 10.0 | 10.0 | 10.0 | 7.0 | 7.0 |
| | Magenta pigment dispersion | 15% | | | | | | | |
| | Yellow pigment dispersion | 15% | | | | | | | |
| | Black pigment dispersion | 15% | | | | | | | |
| Organic solvent | 1,3-butanediol | | 12.8 | 15.0 | 15.0 | 15.0 | 15.0 | 15.0 | 15.0 |
| | Methoxy-N'N-dimethylpropionamide | | 9.2 | 5.0 | 5.0 | 5.0 | 5.0 | 5.0 | 5.0 |
| | Diethyleneglycol diethyl ether | | 8.2 | 5.0 | 5.0 | 5.0 | 5.0 | 5.0 | 5.0 |
| | Triethyleneglycol butyl methyl ether | | 8.4 | 5.0 | 5.0 | 5.0 | 5.0 | 5.0 | 5.0 |
| Alkali | Aqueous sodium hydroxide solution | 4% | | 0.75 | 0.25 | | | | 0.31 |
| | Calcium hydroxide | 100% | | | | | | 0.01 | |
| Resin particle | Water-dispersible polyurethane resin particle (A) | 25% | | 12.0 | 40.0 | 40.0 | 40.0 | 45.0 | |
| | Water-dispersible polyurethane resin particle (B) | 25% | | | | | | | 50.0 |
| | Water-dispersible polyurethane resin particle (C) | 25% | | | | | | | |
| | Water-dispersible polyurethane resin particle (D) | 25% | | | | | | | |
| | Acryl silicone polymer resin particle A | 40% | | | | | | | |
| Surfactant | Siloxane compound | 100% | | 1.0 | 1.0 | 1.0 | 1.0 | 1.0 | 1.0 |
| Water | Ion-exchanged water | | | filling-up amount | filling-up amount | filling-up amount | filling-up amount | filling-up amount | filling-up amount |
| | Total (% by mass) | | | 100.0 | 100.0 | 100.0 | 100.0 | 100.0 | 100.0 |
| Pigment concentration | | | | 1.5 | 1.5 | 1.5 | 1.5 | 1.1 | 1.1 |
| Resin solid content | | | | 3.0 | 10.0 | 10.0 | 10.0 | 11.3 | 12.5 |
| Resin solid content ratio (relative to 1 of pigment) | | | | 2.0 | 6.7 | 6.7 | 6.7 | 10.7 | 11.9 |
| Production method* | | | | 1 | 1 | 2 | 3 | 1 | 1 |
| Evaluation result | Concentration of compound represented by general formula (I) in ink | | | 2 ppm | 4 ppm | 7 ppm | 7 ppm | 7 ppm | 9 ppm |
| | Fixity | | | 1 | 0 | 0 | 0 | 0 | 0 |
| | Liquid permeability A | | | A | A | A | A | A | B |

TABLE 1-continued

| | | Examples | | | | | |
|---|---|---|---|---|---|---|---|
| | | 7<br>Ink 7<br>C | 8<br>Ink 8<br>C | 9<br>Ink 9<br>M | 10<br>Ink 10<br>Y | 11<br>Ink 11<br>K | 12<br>Ink 12<br>clear |
| Component | | | | | | | |
| Colorant | Cyan pigment dispersion | 10.0 | 10.0 | | | | |
| | Magenta pigment dispersion | | | 15.0 | | | |
| | Yellow pigment dispersion | | | | 15.0 | | |
| | Black pigment dispersion | | | | | 15.0 | |
| Organic solvent | 1,3-butanediol | 15.0 | 15.0 | 15.0 | 15.0 | 15.0 | 15.0 |
| | Methoxy-N'N-dimethylpropionamide | 5.0 | 5.0 | 5.0 | 5.0 | 5.0 | 5.0 |
| | Diethyleneglycol diethyl ether | 5.0 | 5.0 | 5.0 | 5.0 | 5.0 | 5.0 |
| | Triethyleneglycol butyl methyl ether | 5.0 | 5.0 | 5.0 | 5.0 | 5.0 | 5.0 |
| Alkali | Aqueous sodium hydroxide solution | 0.25 | 0.25 | 0.22 | 0.22 | 0.22 | 0.32 |
| | Calcium hydroxide | | | | | | |
| Resin particle | Water-dispersible polyurethane resin particle (A) | | | 35.0 | 35.0 | 35.0 | 35.0 |
| | Water-dispersible polyurethane resin particle (B) | | | | | | |
| | Water-dispersible polyurethane resin particle (C) | 40.0 | | | | | |
| | Water-dispersible polyurethane resin particle (D) | | 40.0 | | | | |
| | Acryl silicone polymer resin particle A | | | | | | 10.0 |
| Surfactant | Siloxane compound | 1.0 | 1.0 | 1.0 | 1.0 | 1.0 | 1.0 |
| Water | Ion-exchanged water | filling-up amount | filling-up amount | filling-up amount | filling-up amount | filling-up amount | filling-up amount |
| | Total (% by mass) | 100.0 | 100.0 | 100.0 | 100.0 | 100.0 | 100.0 |
| Pigment concentration | | 1.5 | 1.5 | 2.3 | 2.3 | 2.3 | 0 |
| Resin solid content | | 10.0 | 10.0 | 8.8 | 8.8 | 8.8 | 12.8 |
| Resin solid content ratio (relative to 1 of pigment) | | 6.7 | 6.7 | 3.9 | 3.9 | 3.9 | |
| Production method* | | 1 | 1 | 1 | 1 | 1 | 1 |
| Evaluation result | Concentration of compound represented by general formula (I) in ink | 7 ppm | 5 ppm | 5 ppm | 4 ppm | 6 ppm | 6 ppm |
| | Fixity | 0 | 0 | 0 | 0 | 0 | 0 |
| | Liquid permeability A | A | A | A | A | A | A |

*Production method
1: Alkali is added to the resin. 2: The resin is aged. 3: The ink is aged.

TABLE 2

| | | Solid content concentration | SP value (Fedors) | Comparative Examples | | | | | | | | | | |
|---|---|---|---|---|---|---|---|---|---|---|---|---|---|---|
| | | | | 1<br>Ink 13<br>C | 2<br>Ink 14<br>C | 3<br>Ink 15<br>C | 4<br>Ink 16<br>C | 5<br>Ink 17<br>C | 6<br>Ink 18<br>C | 7<br>Ink 19<br>M | 8<br>Ink 20<br>Y | 9<br>Ink 21<br>K | 10<br>Ink 22<br>clear | 11<br>Ink 23<br>C |
| Component | | | | | | | | | | | | | | |
| Colorant | Cyan pigment dispersion | 15% | | 10.0 | 10.0 | 7.0 | 10.0 | 10.0 | 10.0 | | | | | 10.0 |
| | Magenta pigment dispersion | 15% | | | | | | | | 15.0 | | | | |
| | Yellow pigment dispersion | 15% | | | | | | | | | 15.0 | | | |
| | Black pigment dispersion | 15% | | | | | | | | | | 15.0 | | |
| Organic solvent | 1,3-butanediol | | 12.8 | 15.0 | 15.0 | 15.0 | 15.0 | 15.0 | 15.0 | 15.0 | 15.0 | 15.0 | 15.0 | 15.0 |
| | Methoxy-N'N-dimethyl-propionamide | | 9.2 | 5.0 | 5.0 | 5.0 | 5.0 | 5.0 | 5.0 | 5.0 | 5.0 | 5.0 | 5.0 | 5.0 |
| | Diethylene-glycol diethyl ether | | 8.2 | 5.0 | 5.0 | 5.0 | 5.0 | 5.0 | 5.0 | 5.0 | 5.0 | 5.0 | 5.0 | 5.0 |
| | Triethylene-glycol butyl methyl ether | | 8.4 | 5.0 | 5.0 | 5.0 | 5.0 | 5.0 | 5.0 | 5.0 | 5.0 | 5.0 | 5.0 | 5.0 |
| Alkali | Aqueous sodium hydroxide solution | 4% | | 0.75 | 0.25 | | 0.25 | 0.25 | 0.25 | 0.22 | 0.22 | 0.22 | | 0.25 |

TABLE 2-continued

| | | Solid content concentration | SP value (Fedors) | Comparative Examples | | | | | | | | | | |
|---|---|---|---|---|---|---|---|---|---|---|---|---|---|---|
| | Component | | | 1 Ink 13 C | 2 Ink 14 C | 3 Ink 15 C | 4 Ink 16 C | 5 Ink 17 C | 6 Ink 18 C | 7 Ink 19 M | 8 Ink 20 Y | 9 Ink 21 K | 10 Ink 22 clear | 11 Ink 23 C |
| | Calcium hydroxide | 100% | | | | | 0.01 | | | | | | | |
| Resin particle | Water-dispersible polyurethane resin particle (A) | 25% | | 12.0 | 40.0 | 45.0 | | | | 35.0 | 35.0 | 35.0 | 35.0 | |
| | Water-dispersible polyurethane resin particle (B) | 25% | | | | | 40.0 | | | | | | | |
| | Water-dispersible polyurethane resin particle (C) | 25% | | | | | | 40.0 | | | | | | |
| | Water-dispersible polyurethane resin particle (D) | 25% | | | | | | | 40.0 | | | | | |
| | Acryl silicone polymer resin particle A | 40% | | | | | | | | | | | 10.0 | 25.0 |
| Surfactant | Siloxane compound | 100% | | 1.0 | 1.0 | 1.0 | 1.0 | 1.0 | 1.0 | 1.0 | 1.0 | 1.0 | 1.0 | 1.0 |
| Water | Ion-exchanged water | | | filling-up amount | filling-up amount | filling-up amount | filling-up amount | filling-up amount | filling-up amount | filling-up amount | filling-up amount | filling-up amount | filling-up amount | filling-up amount |
| | Total (% by mass) | | | 100.0 | 100.0 | 100.0 | 100.0 | 100.0 | 100.0 | 100.0 | 100.0 | 100.0 | 100.0 | 100.0 |
| Pigment concentration | | | | 1.5 | 1.5 | 1.1 | 1.5 | 1.5 | 1.5 | 2.3 | 2.3 | 2.3 | 0 | 1.5 |
| Resin solid content | | | | 3.0 | 10.0 | 11.3 | 10.0 | 10.0 | 10.0 | 8.8 | 8.8 | 8.8 | 12.75 | 10.0 |
| Resin solid content ratio (relative to 1 of pigment) | | | | 2.0 | 6.7 | 10.7 | 6.7 | 6.7 | 6.7 | 3.9 | 3.9 | 3.9 | | 6.7 |
| Production method* | | | | | | | | | | | | | | |
| Evaluation result | Concentration of compound represented by general formula (I) in ink | | | 11 ppm | 20 ppm | 22 ppm | 18 ppm | 20 ppm | 21 ppm | 18 ppm | 17 ppm | 18 ppm | 19 ppm | 0 ppm |
| | Fixity | | | 1 | 0 | 0 | 0 | 0 | 0 | 0 | 0 | 0 | 0 | 5 |
| | Liquid permeability | | | C | D | D | D | D | D | D | C | C | C | A |

* Production method
1: Alkali is added to the resin. 2: The resin is aged. 3: The ink is aged.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An ink, comprising:
water;
an organic solvent; and
a polyurethane resin particle containing a polyurethane resin having the structure represented by the following general formula (I), general formula (I)

wherein a rate of content of a compound having a molecular weight of 1,000 or less and having a structure represented by general formula (I) in the ink is 10 ppm or less.

2. The ink according to claim 1, further comprising a colorant.

3. The ink according to claim 2, wherein a rate of solid content of the polyurethane resin particle in the ink is 3% by mass or higher, and a solid content ratio between the colorant and the polyurethane resin particle is 1.0:(2.0 to 11.0).

4. The ink according to claim 1, wherein the ink is used for an impermeable recording medium.

5. A method for producing the ink according to claim 1, comprising:
adding an alkaline solution to an aqueous dispersion of the polyurethane resin particle, or a mixture of the aqueous dispersion of the polyurethane resin particle and another ink component; and
stirring a mixture resulted in the adding at 20° C. or higher,
wherein the polyurethane resin particle is a water-dispersible polyurethane resin particle.

6. A method for producing the ink according to claim 1, comprising:
aging an aqueous dispersion of the polyurethane resin particle, or a mixture of the aqueous dispersion of the polyurethane resin particle and another ink component, at 40° C. or lower for 100 days or longer; and
filtering a product resulted in the aging,
wherein the polyurethane resin particle is a water-dispersible polyurethane resin particle.

7. A method for printing, comprising;
discharging the ink according to claim 1 to print an image.

8. A printer, comprising:
ink cartridge storing the ink according to claim 1; and
a discharging device configured to discharge the ink.

9. The ink according to claim 1, wherein the polyurethane resin is obtained by synthesis from a polyol.

10. The ink according to claim 9, wherein the polyol contains the structure of general formula (I).

11. The ink according to claim 1, wherein the rate of content of the compound having a molecular weight of 1,000 or less and having the structure represented by general formula (I) in the ink is from 2 ppm to 9 ppm.

* * * * *